United States Patent [19]
Lockhart

[11] Patent Number: 6,082,857
[45] Date of Patent: Jul. 4, 2000

[54] LIGHTWEIGHT SAFETY SPECTACLES

[76] Inventor: Michael William Lockhart, 58 Geoffrey Street, Toowoomba QLD, Australia, 4350

[21] Appl. No.: 09/308,256

[22] PCT Filed: Nov. 28, 1997

[86] PCT No.: PCT/AU97/00804

§ 371 Date: May 25, 1999

§ 102(e) Date: May 25, 1999

[87] PCT Pub. No.: WO98/23437

PCT Pub. Date: Jun. 4, 1998

[30] Foreign Application Priority Data

Nov. 29, 1996 [AU] Australia .................... PO 3919
May 8, 1997 [AU] Australia .................... PO 6674

[51] Int. Cl.[7] .................................................. G02B 13/00
[52] U.S. Cl. ........................... 351/178; 351/41; 351/44; 2/439
[58] Field of Search ..................... 351/41, 44, 158, 351/121, 178; 2/12, 426, 439

[56] References Cited

U.S. PATENT DOCUMENTS

| | | | |
|---|---|---|---|
| 2,208,336 | 7/1940 | Marciano | 2/12 |
| 4,610,036 | 9/1986 | LaPrairie | 2/12 |
| 5,000,558 | 3/1991 | Blackstone | 351/41 |

*Primary Examiner*—Huy Mai
*Attorney, Agent, or Firm*—Miles & Stockbridge P.C.; John C. Kerins

[57] ABSTRACT

Lightweight safety spectacles have a lens portion and two wing portions formed from a thin sheet of polycarbonate. A flange extends forwardly of the top edge of the lens portion, and a browguard of thin sheet aluminum is fixed to the flange by indentation of one of the opposed faces of the browguard by pin punches.

20 Claims, 8 Drawing Sheets

LIGHTWEIGHT SAFETY SPECTACLES

This application is a 371 of PCT/AU97/00804 filed Nov. 28, 1997.

BACKGROUND OF THE INVENTION

1. Field of the Invention

THIS INVENTION relates to lightweight safety spectacles. The term "safety spectacles" shall include safety glasses and safety eyewear protection.

2. Prior Art

Safety authorities around the world have set standards for eye protection in industrial applications. For example, Australia and New Zealand have established Standard "AS/NZS 1337-1992" for such eye protectors. The standards usually set down criteria for the eye protectors and include parameters such as (a) dimensions, (b) visual quality, (c) optical quality, (d) materials, (e) ventilation, (f) impact resistance, (g) penetration resistance, (h) thermal stability and (i) protection against corrosion. Other criteria may also be specified.

Even the best eye protectors will not be worn, even if specified in a workplace, if the wearers find them uncomfortable or restricting to wear.

Employees will tend to oppose the provision, or replacement, of eye protectors if they are expensive to purchase.

To be acceptable, eye protectors must satisfy the legislated safety criteria; be comfortable and easy to wear; and be inexpensive to purchase. The task for eye protection manufacturers is to answer three conflicting criteria.

Examples of safety spectacles are disclosed in, inter alia, U.S. Pat. No. 4,405,214 (BOLLÉ); U.S. Pat. No. 4,541,125 (PHILLIPS); U.S. Pat. No. 4,547,909 (BELL); U.S. Pat. No. 4,796,986 (GOWDY, Jr.); U.S. Pat. No. 5,000,558 (BLACKSTONE); U.S. Pat. No. 5,343,258 (LACHMAN et al); Des. Pat. No. 356,322 (BOLLÉ); Des. Pat. No. 317,012 (HIRSCHMAN); Des. Pat. No. 337,595 (REYMONDET et al); and Des. Pat. No. 334,758 (REYMONDET et al).

Generally, the safety spectacles disclosed therein are assembled from a large number of components and so are relatively expensive to manufacture and assemble.

Furthermore, they generally do not include a browguard to prevent articles, eg., metal or glass slivers, sparks, etc., falling between the lenses and the wearer's forehead into the wearer's eyes.

Both U.S. Pat. No. 4,547,909 (PHILLIPS) and Des. Pat. No. 356,322 (BOLLÉ) do disclose browguards, but the overall constructions are still complex and require the assembly of a number of components (including moulded plastic components).

SUMMARY OF THE PRESENT INVENTION

It is an object of the present invention to provide a method of manufacturing safety spectacles which is relatively simple and inexpensive.

It is a preferred object to provide a method where the safety spectacles can be manufactured from only two components.

It is a further preferred object to provide a method which only requires simple tools and minimal assembly and is suitable for unskilled or semi-skilled labour.

It is a still further preferred object to provide a method which results in safety spectacles which meet the safety standards, are light and comfortable to wear, and inexpensive to manufacture.

It is a still further preferred object to provide the safety spectacles manufactured by the method.

Other preferred objects will become apparent from the following description.

In one aspect, the present invention resides in a method of manufacturing safety spectacles including the steps of:

(a) cutting a lens portion and two wings portions from a sheet of transparent, impact-resistant plastic sheet;

(b) forming a flange, to mount a browguard, at or adjacent a top edge of the lens portion;

(c) forming a nose bridge portion at or adjacent a lower edge of the lens portion;

(d) fitting a browguard to the flange; and (e) fixing the browguard to the flange.

Preferably, the plastic sheet is formed of polycarbonate, eg., sold under the Registered Trade Mark "LEXAN".

Preferably, the sheet is 1.0–2.0 mm, more preferably 1.0–1.5 mm, thick.

The steps (b) and (c) may be effected sequentially, or simultaneously, in a press.

Preferably, where the lens portion and the two wing portions are formed integrally, the sheet is deformed or bent, in another press, so that the wings extend substantially perpendicularly rearwardly of the lens portion in step (a1), before steps (b) and (c) are effected.

While the flange may be co-planar with the lens portion, it is preferred that it extend substantially perpendicularly forward of the lens portion.

Preferably, the browguard is formed from relatively thin metal, preferably aluminium or polycarbonate, sheet and has a mounting portion, having two opposed faces to receive the flange therebetween.

The browguard may be secured to the flange by adhesives, screws or other fixing means.

Preferably, the browguard is secured by deformation or indentation of at least one of the opposed faces into the flange, eg., by pin punch(es).

In a second aspect, the present invention resides in safety spectacles manufactured by the method hereinbefore described.

BRIEF DESCRIPTION OF THE DRAWINGS

To enable the invention to be fully understood, preferred embodiments will now be described with reference to the accompanying drawings, in which.

DETAILED DESCRIPTION OF THE PREFERRED EMBODIMENTS

Figure 1:
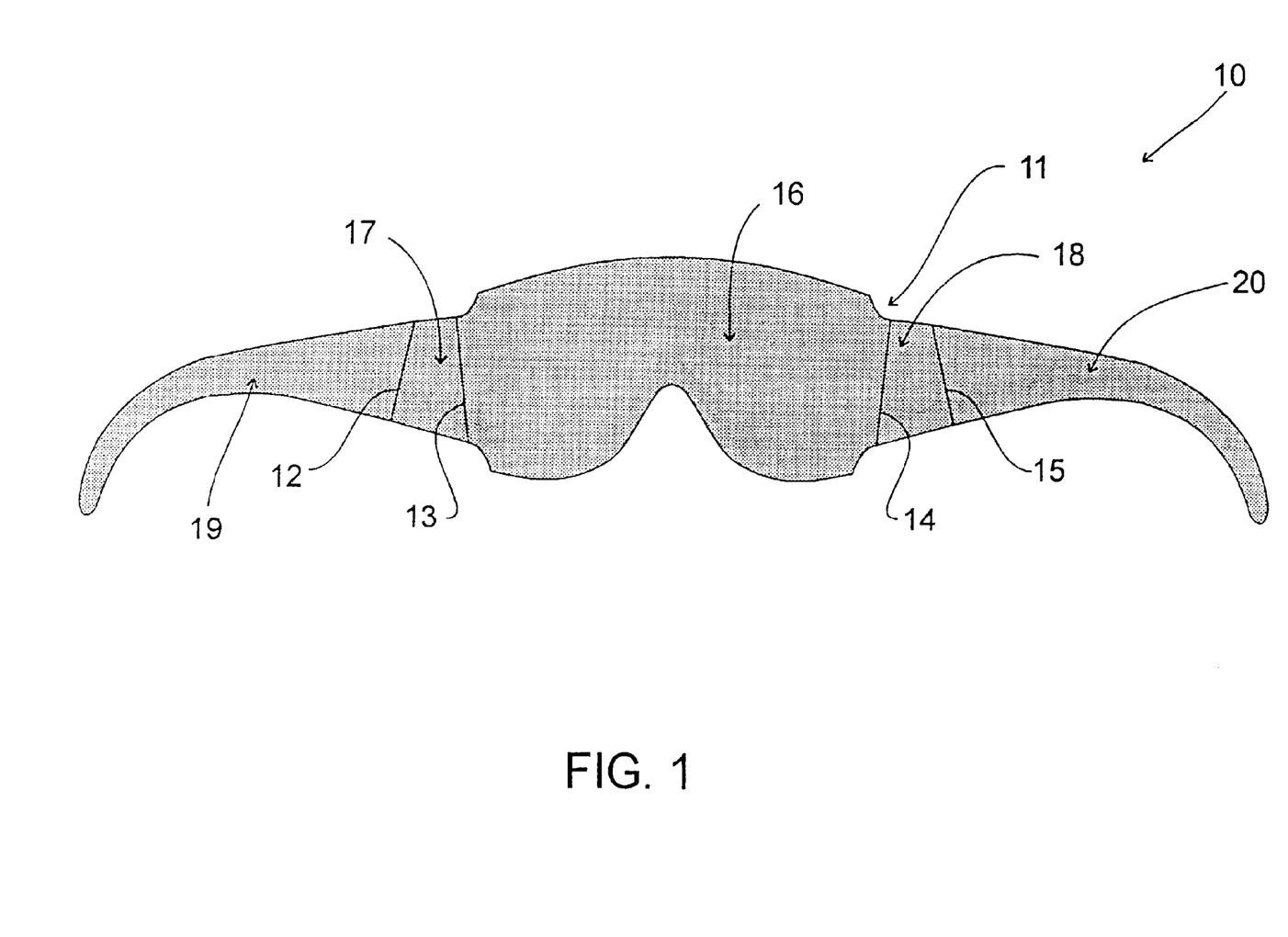
FIG. 1 is a plan view of the blank cut from the polycarbonate sheet.

Referring to FIG. 1, a blank 11 for the safety spectacles 10 is cut from a 1.0 mm thick sheet of polycarbonate (eg., sold under the Trade Mark "LEXAN"). (Both sides of the sheet are covered with a protective plastic film indicated by the stippled finish.)

Figure 2:
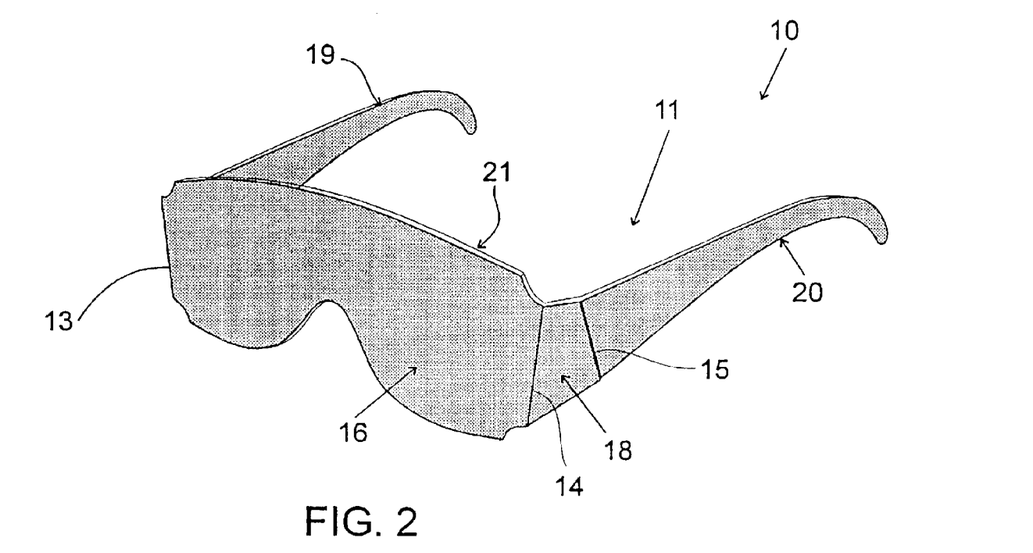
FIGS. 2 and 3 are perspective views showing the blank as it is progressively folded to shape.

As shown in FIG. 2, the blank 11 is folded in a first press (not shown) about four fold lines 12–15 (see FIG. 1) to form a lens portion 16, a pair of corner portions 17, 18 and a pair of wing portions 19, 20 in an integral unit.

Using the (second) press to be hereinafter described with reference to FIGS. 6 and 7, a flange 21 is formed along the top edge of the lens portion 16 and extends forwardly thereof substantially perpendicular to the general plane of the lens portion 16. A nose bridge portion 22 is formed along the lower edge of the lens portion, as shown in FIG. 3.

Figure 4:
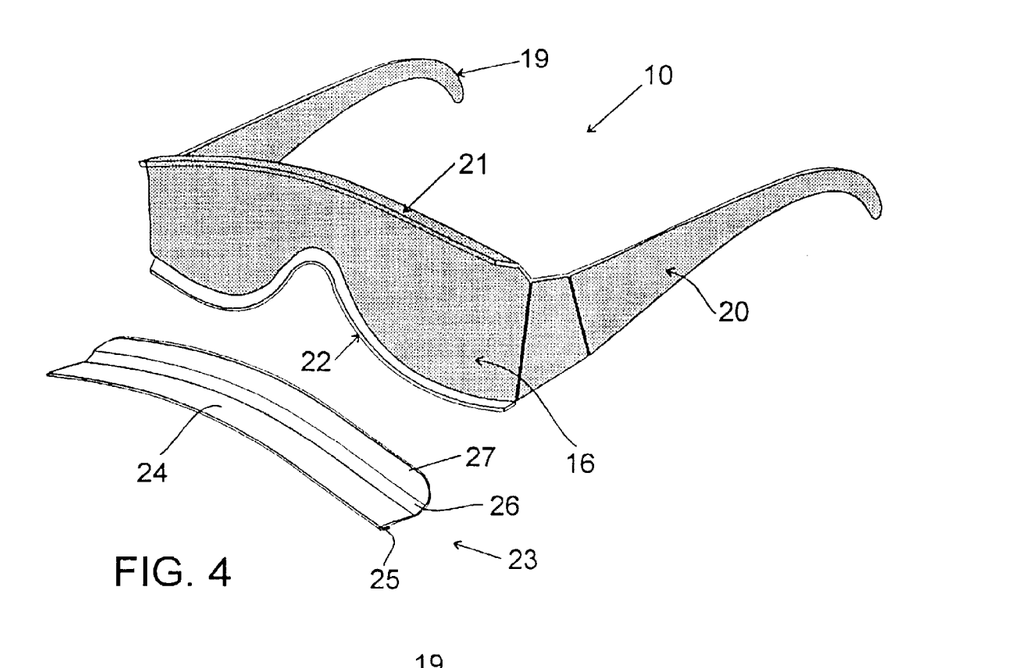
FIG. 4 is a perspective view of the blank and the browguard before final assembly.

A browguard 23 (see FIG. 4) is formed from the (eg., 0.5–1.0, more preferably 0.6 mm) aluminium sheet and has a mounting portion, of substantially C-section, with opposed faces 24, 25, an intermediate portion 26 and a rearward flange 27.

Figure 5:
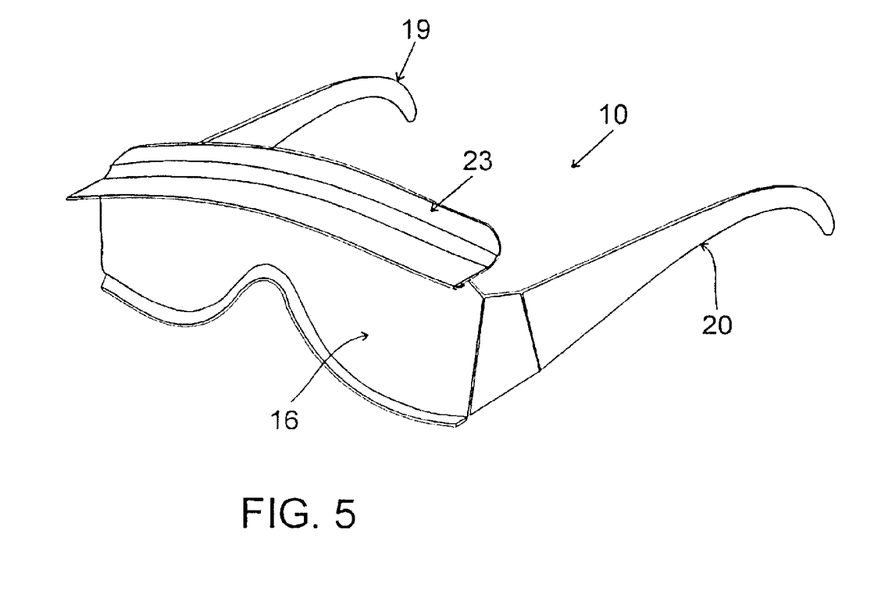
FIG. 5 is a perspective view of the final spectacles.

As shown in FIG. 5, the browguard 23 is fitted to the blank 11, with the flange 21 engaged between the opposed faces 24, 25 of the mounting portion, and is secured by indentation of the face 25, to be hereinafter described with reference to FIGS. 8 to 15.

Figure 3:
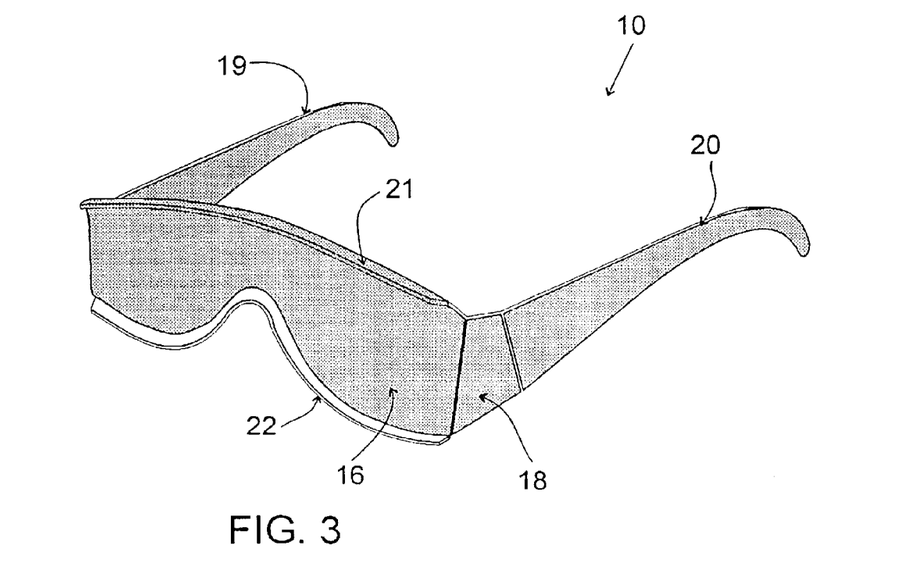
Figure 6:
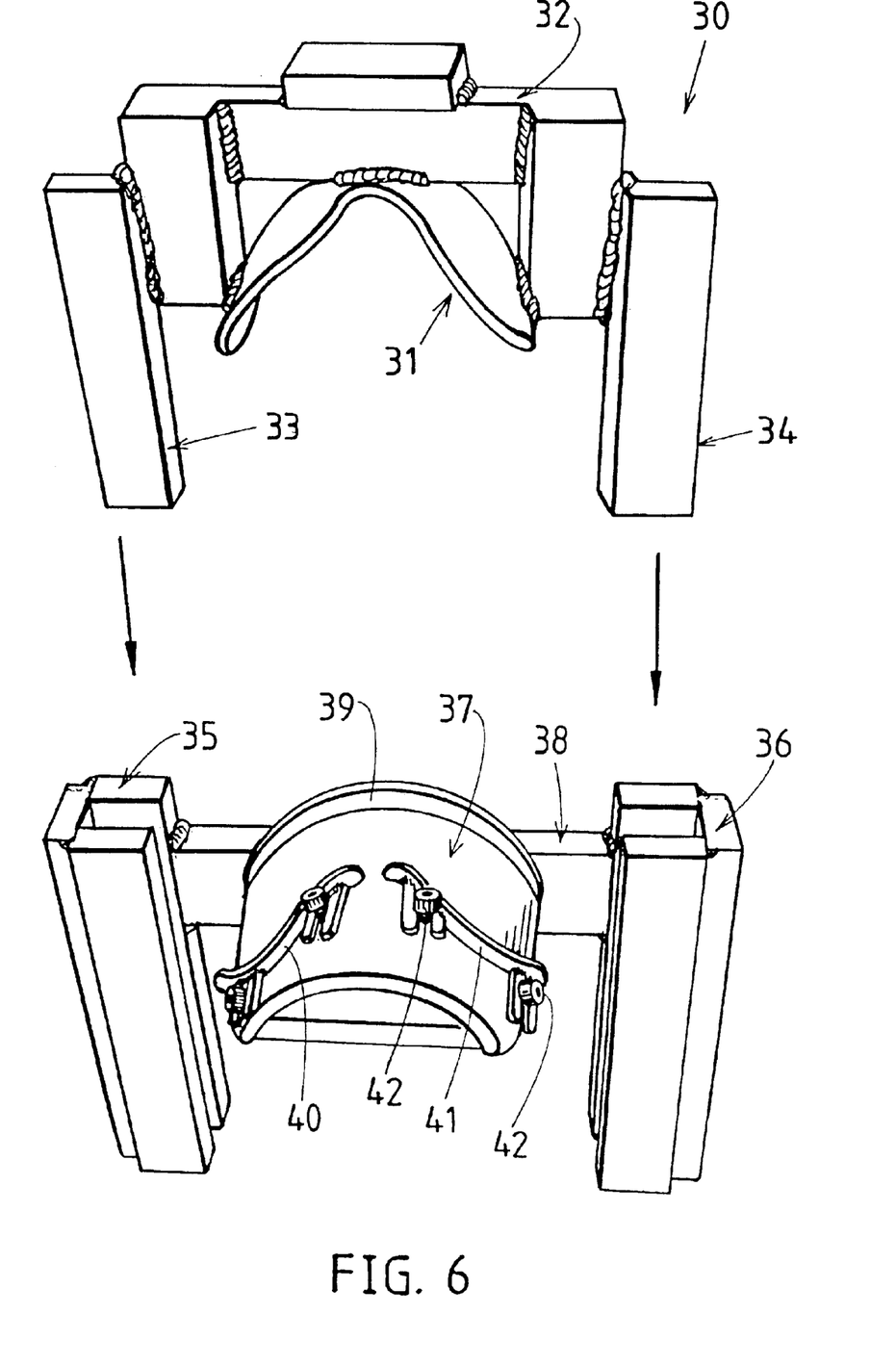
FIG. 6 is an exploded perspective view of the press for forming the flange and nose-piece portion on the blank.
Figure 7:
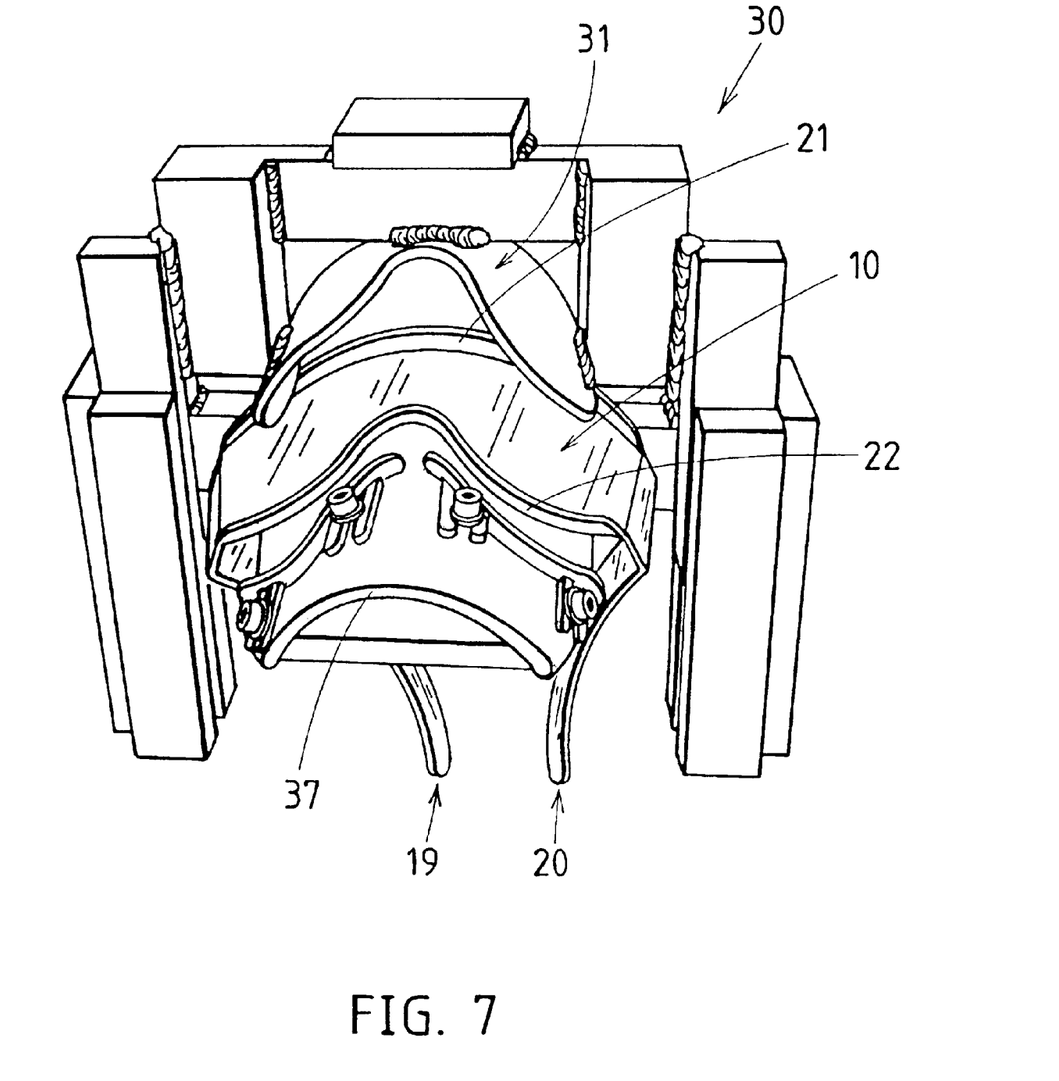
FIG. 7 is a perspective view of the press with the blank after forming.

FIGS. 6 and 7 show the press 30, used to form the blank 11 from the shape in FIG. 2 to the shape shown in FIG. 3.

A concave top press plate 31 is mounted on a head 32 on slides 33, 34, received in guides 35, 36, which support a fixed bottom plate 37 on a head 38. The convex bottom plate 37 has a flange-bending plate 39 at one end, and a pair of adjustable nose-bridge forming plates 40, 41 adjacent the other end, the plates 40, 41 being adjustably located by locking screws 42.

The blank 11, as folded in FIG. 2, is placed in the press 30 and the top press plate 31 is advanced towards the bottom press plate 37. The flange-bending plate 39 commences bending the flange 21 out of the plane of the lens portion 16 before the forming plates 40, 41 commence bending the nose-bridge portion 22, to reduce the force required to advance the top plate 31. However, both the flange 21 and nose-bridge portion 22 can be formed simultaneously, if preferred.

It will be noted that, as shown in FIG. 7, the wings 19, 20 are forced inwardly as the press 30 is closed—they "spring" outwardly to their final position as the press 30 is opened.

Referring now to FIGS. 8 to 15, the fixing of the browguard 23 to the flange 21 will now be described.

Figures 8, 9, 10:
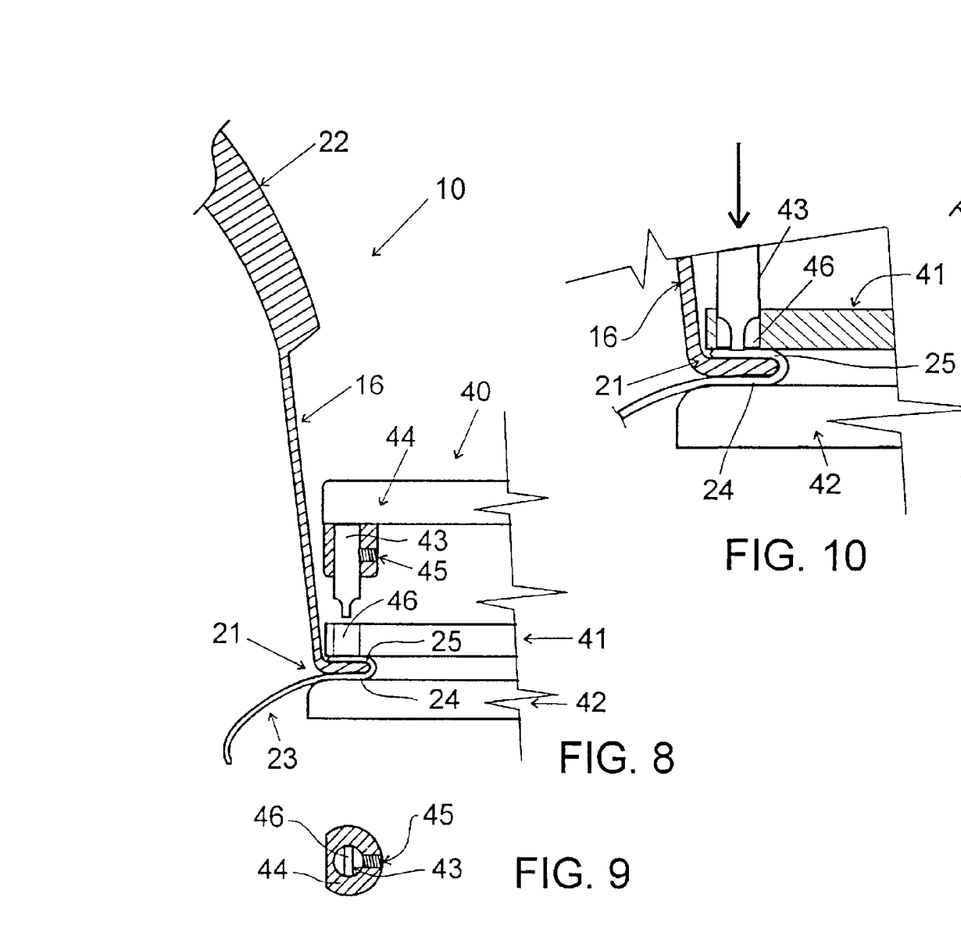
FIG. 8 is a schematic sectional side view of the first stage of forming the indentations in the browguard.
FIG. 9 is a bottom plan view of a pin punch.
FIGS. 10 and 11 correspond to FIG. 8 in the second and third stages, respectively.

The flange 21 and the faces 24, 25 of the mounting portion of the browguard 23 are inserted between the jaws 41, 42 of a punch machine 40 having a plurality of spaced pin punches 43. Each punch 43 is guided in a punch head 44 (via a grub screw 45) and is aligned with a respective hole 46 in the jaw 41.

As shown in FIGS. 8 to 11, each punch 45 has a diametrical nose portion 46.

Figures 11, 12:
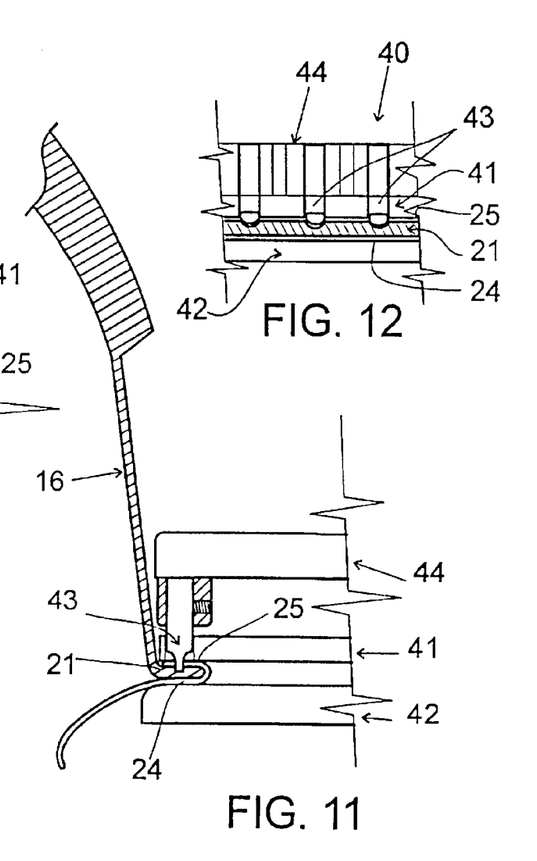
FIG. 12 is a sectional front view of the third stage.
Figure 13:
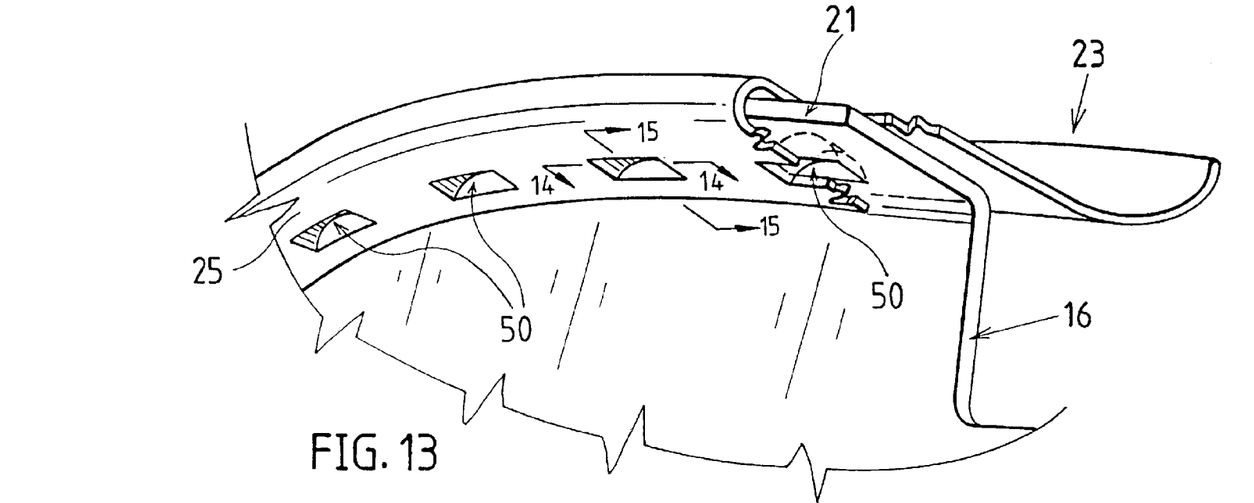
FIG. 13 is a perspective underside view showing the fixing of the brow guard to the flange.
Figure 14:
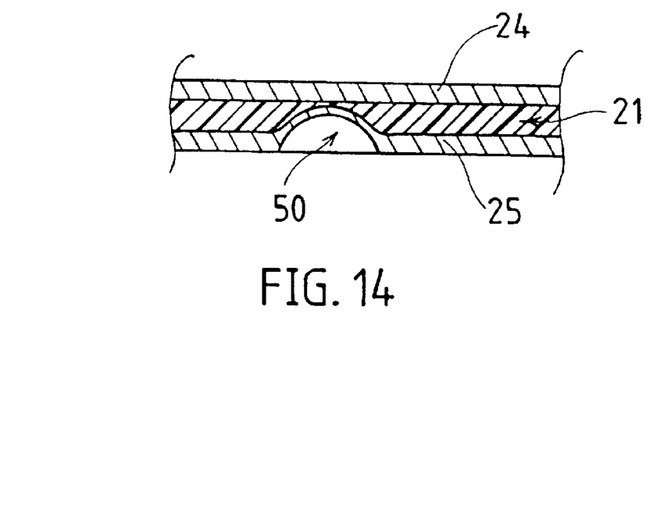
FIGS. 14 and 15 are sectional views taken on line 14—14, and 15—15, respectively, on FIG. 13.
Figure 15:
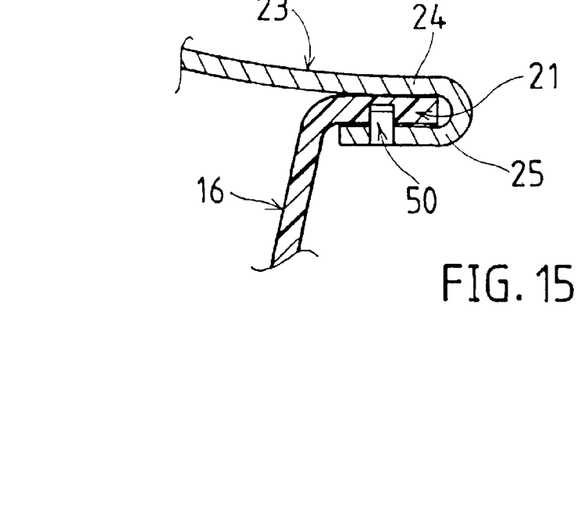

As each punch 43 is advanced—see FIGS. 8, 10, and 11/12, it forms an indentation 50 in the face 25 of the browguard 23, where the indentation 50 is pressed into the material of the flange 21—see FIGS. 11 to 15. The indentations 50 lock the browguard 23 to the flange 21.

It will be readily apparent to the skilled addressee that the indentations 50 provide a simple, yet mechanically strong, means of fixing the browguard 23 to the flange 21 and avoids the mess which may occur with adhesives, although these may be used if preferred.

Preferably, the protective films are removed after the fixing step, to minimise damage to the lens portion during the forming and fixing steps.

In the embodiment shown in FIGS. 1 to 5, the wings 19, 20 have been shown integral with the lens portion 16 (and corner portions 17, 18).

Figure 16:
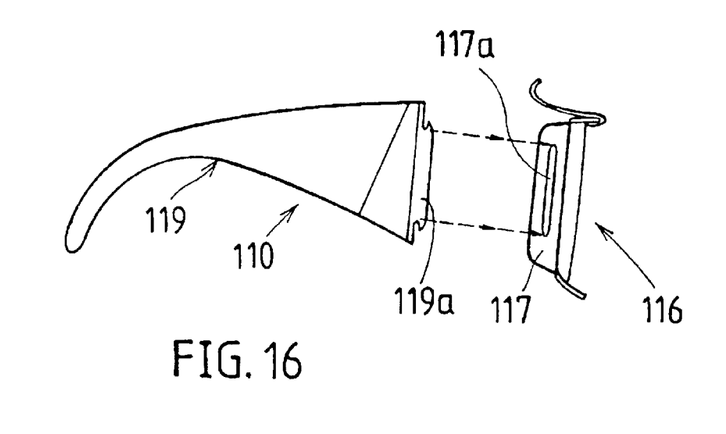
FIGS. 16 and 17 are respective side and perspective front views of a second embodiment.
Figure 17:
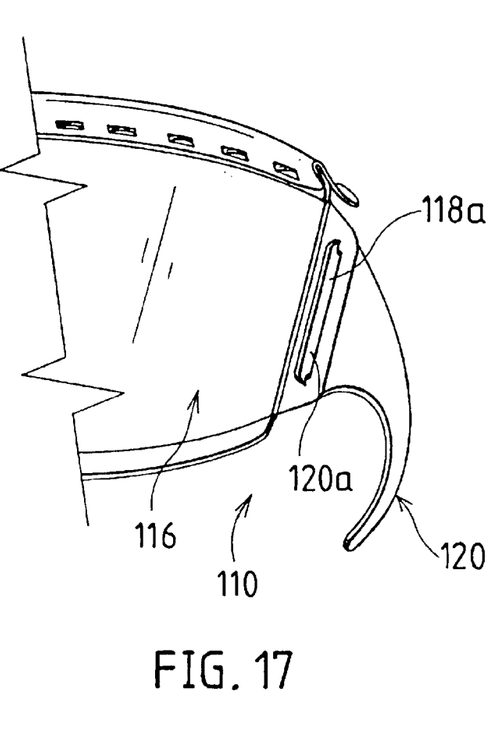
Figure 18:
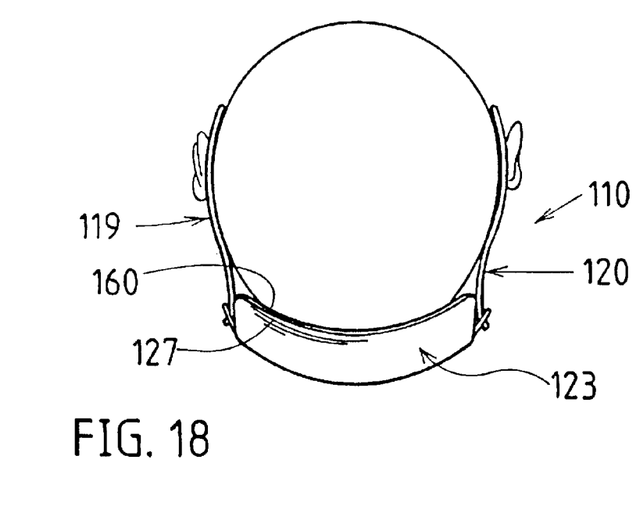
FIG. 18 is a schematic top plan view of a person wearing the spectacles of FIGS. 16 and 17.

As shown in FIGS. 16 to 18, the wings 119, 120 of the second embodiment may be detachable, being secured by lugs 119a, 120a engageable in slots 117a, 118a in the corner portions 117, 118.

As shown in FIG. 18, the rearward flange 127 of the browguard 123 is shaped to generally conform to the wearer's brow 160 to prevent, eg., sparks, metal slivers, etc., falling between the wearer's brow 160 and the lens portion 116. In addition, the browguard provides total, positive UV protection for the wearer's eyes.

The spectacles 10, 110 satisfy the criteria of the appropriate standards for eye protection; are light (eg., half the weight of conventional safety spectacles) and comfortable to wear; and are inexpensive to manufacture. The combination of the flange, nose-bridge and the browguard provide rigidity for the lens portion, and assist in enabling the lens portion to resist any impacts. The spectacles may have a tinted lens portion, by selection of suitable polycarbonate sheet from which the blanks are cut. The polycarbonate lens of the spectacles also provides significant UV protection for the eyes.

Various changes and modifications may be made to the embodiments described and illustrated without departing from the present invention.

I claim:

1. A method of manufacturing safety spectacles comprising the steps of:
    (a) cutting a lens portion and two wing portions from a sheet of transparent, impact-resistant plastic sheet;
    (b) deforming or overbending the lens portion in a press so that the wing portions extend substantially perpendicularly of the lens portion, and forming a flange on which to mount a browguard, at or adjacent a top edge of the lens portion, and forming a nose bridge portion at or adjacent a lower edge of the lens portion;
    (c) allowing the deformed or overbent lens portion to relax to a final shape;
    (d) fitting a browguard to the flange; and
    (e) fixing the browguard to the flange.

2. A method as claim in claim 1 wherein the plastic sheet is formed of polycarbonate.

3. A method as claimed in claim 2 wherein the plastic sheet is 1.0–2.0 mm thick.

4. A method as claimed in claim 3 wherein the plastic sheet is 1.0–1.5 mm thick.

5. A method as claimed in claim 3 wherein the flange is a co-planar with the lens portion.

6. A method as claimed in claim 2 wherein the flange extends substantially perpendicularly forward of the lens portion.

7. A method as claimed in claim 1 wherein steps (b) and (c) are effected sequentially, or simultaneously, in a press.

8. A method as claimed in claim 1 wherein the flange is co-planar with the lens portion.

9. A method as claimed in claim 1 wherein the flange extends substantially perpendicularly forward of the lens portion.

10. A method as claimed in claim 1 wherein the browguard is formed from relatively thin material, and has a mounting portion having two opposed faces to receive the flange therebetween.

11. A method as claimed in claim 10 wherein the browguard is formed of aluminum sheet.

12. A method as claimed in claim 10 wherein the browguard is formed of polycarbonate sheet.

13. A method as claimed in claim 10 wherein the browguard is secured to the flange by an adhesive.

14. A method as claimed in claim 10 wherein the browguard is secured to the flange by deformation or indentation of one of the opposed faces of the browguard into the flange by pin punch(es).

15. Safety spectacles comprising:
    a lens portion and a first and second wing portions;
    said first and second wing portions being secured to said lens portion in a manner so as to be capable of extending substantially perpendicularly to said lens portion;
    a flange formed integrally with said lens portion and disposed at or adjacent to a top edge of said lens portion;
    a separate browguard member secured to said flange to provide increased structural rigidity to said lens portion, said browguard member extending at least forwardly of a front surface of said lens portion.

16. Safety spectacles as claimed in claim 15 further comprising a nose bridge portion formed integrally with said lens portion and disposed along at least a portion of a lower edge of said lens portion, said nose bridge providing increased structural rigidity to said lens portion.

17. Safety spectacles as claimed in claim 15 wherein said browguard is formed of a relatively thin material, and further has a mounting portion having two opposed faces to receive said flange therebetween.

18. Safety spectacles as claimed in claim 15 wherein the browguard is secured to the flange by an adhesive.

19. Safety spectacles as claimed in claim 15 wherein the browguard is secured to the flange by deformations or indentations introduced into one of said opposed faces of said mounting portion of said browguard, said deformations or indentations extending into said flange.

20. Safety spectacles as claimed in claim 16 wherein said lens portion and said first and second wing portions are formed integrally from a single sheet of plastic material.

* * * * *